June 6, 1967  G. L. HAZELET  3,324,317

SOLID STATE INERTIAL ENERGY GENERATOR-STORAGE SYSTEM

Filed Jan. 21, 1965

INVENTOR.
GERALD L. HAZELET

BY *Jackwood, Woodard, Smith & Weikart*
Attorneys

United States Patent Office 3,324,317
Patented June 6, 1967

3,324,317
SOLID STATE INERTIAL ENERGY GENERATOR-STORAGE SYSTEM
Gerald L. Hazelet, Urbana, Ill., assignor to The Magnavox Company, Fort Wayne, Ind., a corporation of Delaware
Filed Jan. 21, 1965, Ser. No. 428,283
5 Claims. (Cl. 310—8.4)

This invention relates generally to generation and storage of electrical energy, and more particularly to a device of ultimate simplicity responsive to changes of acceleration for generation and storage of electrical energy.

In ordnance work, missiles and projectiles frequently employ electrical energy in their detonator trains. Conventionally, electrical energy is supplied by a battery or the like, and separate devices are employed for applying energy from the battery to the detonator train at the proper time. Means are provided to keep the missile or projectile in a safe unarmed condition until it is desired that the missile or projectile should be armed. Continuous efforts are made to improve the simplicity and reliability of arming and detonator systems for projectiles and missiles. One result of such efforts is exemplified in the system disclosed in United States Patent No. 3,098,163 of Robert W. Bliss, and assigned to the assignee of the present application. The present invention provides still simpler apparatus to achieve the desired results.

It is a general object of the present invention to provide improved means for generation and storage of electrical energy.

It is a further object to provide means capable of generating and storing electrical energy in response to changes of motion.

A further object is to provide means achieving the foregoing objects in a very simple apparatus of sturdy and reliable construction.

Described briefly, the present invention includes in its scope a supported and insulated piezoelectric crystal which is subjected to loading by an inertial mass in response to acceleration of the assembly employing the mass and crystal. The mass and crystal are housed together with a support in such a manner that discharge of a portion of the voltage generated in the crystal is accomplished by ionization of a gas therein, the constants being selected to provide discharge in response to a predetermined degree of acceleration. The arrangement is such that upon decrease of acceleration, electrical energy is stored in the device for use in the missile or projectile whenever desired.

The full nature of the invention will be understood from the accompanying drawings and the following description and claims.

Figure 1:
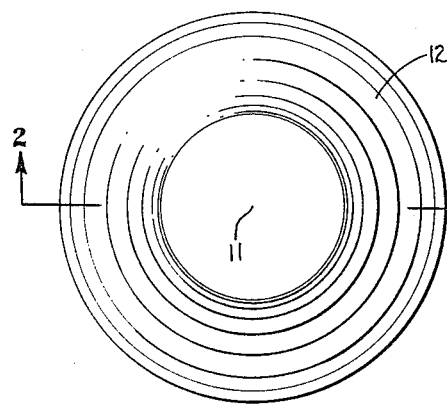
FIG. 1 is a top plan view of a typical embodiment of the present invention.

Referring now to the drawings in detail, the illustrated example is generally symmetrical with respect to the axis 11 and includes a case 12 made of an electrically conductive material and having an electrically conductive support member 13 affixed therein, the support member being electrically insulated from the case by an insulator disc 14 and insulator sleeve 16.

The piezoelectric crystal 17 rests upon the support 13 and is centered on the axis 11 by the cylindrical lateral confining wall 18 of the electrically conductive inertia mass 19, this mass being centered on the axis by the cylindrical confining wall 21 of the insulator sleeve 16. The conical upper end of the inertia mass is spaced from the case 12 by the upper insulator sleeve 22 disposed in the case. Although the lower face 23 of the inertia mass rests upon the upper face 24 of the crystal, and although an abutting relationship is provided between the shoulder 26 of the insulator sleeve 16 and the shoulder 27 of the inertia mass, the inertia mass is free to move in the direction of the arrow 28 with respect to the support 13 and the crystal 17 resting on the support, when the assembly is accelerated in the direction of the arrow 29.

The inertia mass is terminated in the annular lower marginal face 31 which is vertically spaced above the upper face 32 of the support 13 where it projects beyond the outer margins 33 of the crystal. This results in the provision of annular gap 34 between the face 31 and the face 32 and between the wall 21 and the crystal 17. Normally this gap is filled with an ionizable gas for a purpose which will be described.

An electrical terminal 36 is electrically connected to the support 13 and insulated from the case 12 by any suitable means such as the illustrated insulator 37, for example. At the upper end of the inertia element is an impact switch assembly including an electrically conductive plunger 38 disposed in the cylindrical cavity 39 in the inertia mass and normally retained at the bottom of the cavity by the spring 41. When so retained, the lower end 42 of the plunger contacts the upper face 43 at the bottom of the cavity 39. The upper end 44 of the plunger is engageable with the lower face 46 of the upper end of the case for a purpose which will be described.

Operation

Figure 2:
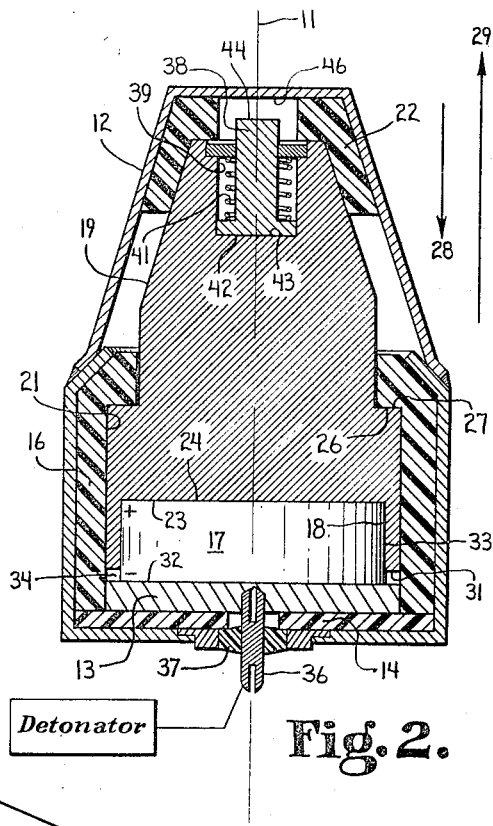
FIG. 2 is a section therethrough taken along the line 2—2 in FIG. 1 and viewed in the direction of the arrows.
Figure 3:
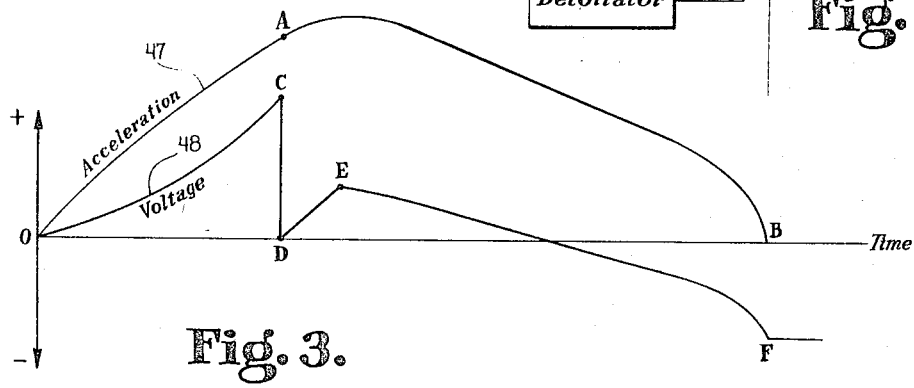
FIG. 3 is a graph illustrating acceleration of the system and the nature of the voltages generated and stored in response thereto.
Figure 4:
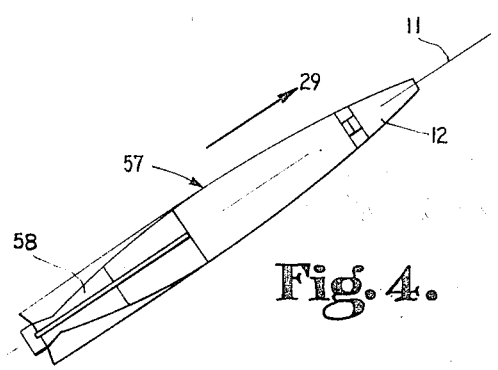
FIG. 4 illustrates schematically a vehicle in the form of a self-propelled missile incorporating the present invention therein.

The operation of the present invention may be best understood with the help of FIG. 3 if it is assumed that the acceleration of the system illustrated in FIG. 2 is in the direction of the arrow 29. Beginning at time zero in FIG. 3, the missile 57 FIG. 4 incorporating the system is accelerated by its rocket motor 58 or other propulsion means in the direction of the arrow 29 in FIGS. 2 and 4 and a graph of the acceleration may appear as illustrated by the curve 47 in FIG. 3. As acceleration increases toward the point A on curve 47, the inertia mass 19, resisting acceleration, applies a load in the direction of the arrow 28 to the upper face of the crystal 17. This force, and the resulting compression of the crystal due to the fact that the inertia mass 19 moves downwardly with respect to the support 13 to an extent limited by the compressibility of the crystal which, of course, is very slight, causes development of a positive potential across the crystal illustrated by the voltage curve 48 in FIG. 3. This potential is developed across the gap 34 and, if the support 13 is considered at zero potential, the lower face 31 of the inertia mass may be considered at the potential of the upper face of the crystal represented by the voltage curve 48.

When the acceleration has reached point A on the acceleration curve, the voltage reaches point C on curve 48 which is sufficient to ionize the gas in the gap 34 causing breakdown thereof whereupon the voltage drops to the value at point D in FIG. 3. As acceleration continues to increase, the voltage across the gap then begins to rise and at point E, the rise of voltage stops because the increase of acceleration ceases.

As acceleration decreases, the force applied to the crystal decreases resulting in expansion thereof whereupon the voltage across the gap begins to decrease. Because the decrease of voltage begins at point E, and because the total change of voltage by the time the acceleration has decreased from its maximum value to zero at point B is equal to the maximum which would have been developed if the breakdown across the gap had not occurred, there will be a negative voltage developed across the gap having the value indicated at point F in FIG. 3. The energy in the crystal and developing a potential indicated at F remains stored in the crystal for use.

In the illustrated example, if the case 12 is connected to one side of an electrical detonator train and the terminal 36 is connected to the other side, the stored energy in the crystal can be used to initiate the detonator. In the illustrated example, this is accomplished by the impact switch when the projectile moving in the direction of the arrow 29 strikes an object whereupon the plunger 38 of the switch is moved by its inertia against the bias of the spring 41 and the upper end 44 thereof contacts the surface 46 of the case closing the detonator train circuit.

As an example, the following values are given to illustrate operation:

| | |
|---|---|
| Piezoelectric crystal 17 diameter | 1.020 inches. |
| Thickness between upper and lower faces | .300 inch. |
| Dielectric constant (K) | 1600. |
| Piezoelectric constant (d33) | $1.42 \times 10^{-9}$ coulombs per pound. |
| (Material: polarized lead zirconate with permanently attached silver electrodes covering the upper and lower faces) | |
| Gap height between surface 31 and surface 32 | .006 inch. |
| Ionogenic gas | Air at a relative humidity of 8%. |

With these values, if the rocket motor imparts an acceleration which causes the inertia mass to apply 850 pounds to the piezoelectric crystal, the resulting stress by its compression will cause a generation of 950 volts which will ionize the gas to short the energy to ground or zero volts. If the motor increases acceleration to its maximum capability, and the resulting maximum acceleration causes a total loading of 950 pounds upon the crystal, the voltage will again rise to 85 volts. Then when the 950 pound loading is relaxed or decreased due to decrease of acceleration, the piezoelectric crystal is stressed by expansion. When the acceleration has decreased to zero (point B in FIG. 3) the retained voltage will be 950 minus 85, or 865 volts negative potential. This voltage will then be retained until utilized.

From the foregoing description, it can be easily seen that the present invention is characterized by maximum simplicity and has a great advantage in that the only movement of any parts therein which may be required to generate and store energy is the infinitesimal movement of the inertia mass relative to the support member which causes the compression and expansion of the crystal. The system is particularly well adapted to use in projectile, rocket, or missile systems where energy is generated on setback accelerations, stored during flight, and used to initiate electrical initiators or detonators upon target impact.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. An inertial energy generator-storage system comprising:
   a generally elongated case having a longitudinal axis and formed of an electrically conductive material;
   a circular insulator disc disposed at the bottom of said case in the interior thereof and extending thereacross perpendicular to said axis and centered on said axis;
   a generally cylindrical insulator sleeve disposed inside said case and having a lower end portion abuttingly engaging said insulator disc;
   a support disc formed of electrically conductive material and fittingly received in said sleeve and affixed to said case and insulated therefrom by said insulator disc and said insulator sleeve;
   a piezo-electric crystal mounted on the upper surface of said support disc, said crystal being generally cylindrical in form;
   an inertia mass member having a generally cylindrical cavity in the lower end thereof, and having an outer cylindrical wall, said inertia member being guidingly and fittingly received in said sleeve, said inertia member having a lower face in annular form comprising the lower marginal edge thereof and encircling said cavity, there being an annular space disposed between said face and the facing portion of said support disc and between said circular disc and the inner wall of said sleeve, said inertia mass member being relatively movable to a limited extent toward said support disc in response to acceleration and deceleration of said case in a direction parallel to said axis for increasing and decreasing a force applied to said crystal by said inertia member, said crystal being sandwiched between a portion of said inertia member and said support disc;
   means limiting the movement of said inertia member away from said support disc;
   an electrical switch including a plunger received in a cavity in the upper end of said inertia member, said plunger being normally retracted in said cavity by a biasing spring, said plunger being electrically connected to said inertia member and having an inertia sufficient to cause said plunger to move upwardly in said cavity and strike a portion of said case to close said switch upon rapid deceleration of said case while moving in a direction opposite the direction of application of force of said spring on said plunger, said plunger being so movable upon such rapid deceleration of said case to contact said case and complete an electrical circuit portion from one pole of said crystal to said case;
   terminal means connected to said support disc and thereby electrically connected to the other pole of said crystal;
   and load means in circuit between said terminal means and said case, whereby energy generated and stored in said crystal is dischargeable through said load means upon contact between said plunger and said case;
   and an ionizable gas disposed in said annular space, the character of the gas and the dimensions of the space being such that a partial discharge of said crystal occurs across said annular space during increase of acceleration of said case through a predetermined value toward a maximum value, the difference between said predetermined value and said maximum value being such that when the acceleration decreases to a zero value, further discharge across said annular space will be avoided and a resulting voltage will be developed across said crystal and maintained thereacross until closure of said switch.

2. An inertia energy generator-storage system comprising:
   a case having an axis;
   a support member mounted in said case;

a piezo-electric crystal mounted on said support member;

an inertia member having a cavity in an end thereof facing said support member, said inertia member being guidingly received in said case and having a lowermost margin thereof spaced from said support member, a portion of said crystal being received in said cavity and said crystal being sandwiched between a portion of said inertia member and said support member, and said inertia member being relatively movable to a limited extent with respect to said support member in response to acceleration and deceleration of said case in a direction parallel to said axis for increasing and decreasing a force applied to said crystal by said inertia member for generating electrical energy in said crystal;

means limiting the movement of said inertia member away from said support member;

said inertia member and said support member having electrically conductive portions including said lowermost margin, said electrically conductive portions thereof and a load means and an inertia switch being in a circuit with said crystal, whereby energy generated in said crystal is dischargeable through said load means upon closure of said inertia switch;

and an ionizable gas disposed in the space between said support member and the lowermost margin of said inertia member, the character of the gas and the dimensions of the space being such that a partial discharge of said crystal occurs across said space during increase of acceleration of said case through a predetermined value toward a maximum value, the difference between said predetermined value and said maximum value being such that when the acceleration decreases to a zero value, further discharge across said space will be avoided and a resulting voltage will be developed across said crystal and maintained thereacross until closure of said switch.

3. An inertia energy generator-storage system comprising:

a housing;

a crystal support member in said housing;

a crystal supported by said crystal support member;

an inertia mass disposed in said housing and supported by said crystal, said inertia mass being relatively movable with respect to a portion of said crystal to a limited extent by compression of said crystal between said crystal support member and said inertia mass when said housing is accelerated in a predetermined direction, said inertia mass and crystal support member being made of electrically conductive material with said inertia mass being in contact with one face of said crystal and said support member being in contact with the other face of said crystal to produce a potential difference between said inertia mass and said support member as generated by said crystal when said support mass is accelerated and the inertia of said inertia mass resists acceleration, compressing said crystal, a portion of said inertia mass being separated from a portion of said support member a predetermined distance to provide a discharge gap therebetween;

and an ionizable gas disposed in said discharge gap to discharge said inertia mass to said support member upon development of a predetermined potential difference across said crystal, said gap dimensions and gas therein being such that discharge across said gap by ionization of said gas is the first discharge of said crystal attainable during acceleration of said housing in said predetermined direction.

4. An inertial energy generator-storage system comprising:

a generally elongated case having a longitudinal axis and formed of an electrically conductive material;

an insulator means disposed at the base of said case in the interior thereof;

an insulator sleeve disposed inside said case and having a lower end portion engaging said insulator disc;

a support disc formed of electrically conductive material received in said sleeve and affixed to said case and insulated therefrom by said insulator disc and said insulator sleeve;

a piezo-electric crystal mounted on the upper surface of said support disc;

an inertia mass member having a cavity in the lower end thereof, and having an outer wall, said inertia member being received in said sleeve and having a lower annular face, there being an annular space disposed between said annular face and the facing portion of said support disc, said inertia mass member being relatively movable to a limited extent toward said support disc in response to acceleration and deceleration of said case in a direction parallel to said axis for increasing and decreasing a force applied to said crystal by said inertia member, said crystal being sandwiched between a portion of said inertia member and said support disc;

means limiting the movement of said inertia member away from said support disc;

and an electrical switch including a plunger received in the upper end of said inertia member, said plunger being normally retracted in said cavity, said plunger being electrically connected to said inertia member and having an inertia sufficient to cause said plunger to move upwardly and strike a portion of said case to close said switch upon rapid deceleration of said case while moving in a direction opposite the direction of application of force of said spring on said plunger, said plunger being so movable upon such rapid deceleration of said case to contact said case and complete an electrical circuit portion from one pole of said crystal to said case.

5. The system in accordance with claim 4 including terminal means connected to said support disc and thereby electrically connected to the other pole of said crystal;

and load means in circuit between said terminal means and said case, whereby energy generated and stored in said crystal is dischargeable through said load means upon contact between said plunger and said case;

and an ionizable gas disposed in said annular space, the character of the gas and the dimensions of the space being such that a partial discharge of said crystal occurs across said annular space during increase of acceleration of said case through a predetermined value toward a maximum value.

References Cited

UNITED STATES PATENTS 3,098,163   7/1963   Bliss _____ 102—70.2 X

FOREIGN PATENTS 909,549   10/1962   Great Britain.

BENJAMIN A. BORCHELT, *Primary Examiner.*

W. C. ROCH, *Assistant Examiner.*